United States Patent

[11] 3,630,287

| [72] | Inventor | Arnold S. Gold<br>1325 Woodland Drive, Monroeville, Pa.<br>15146 |
|---|---|---|
| [21] | Appl. No. | 39,063 |
| [22] | Filed | May 20, 1970 |
| [45] | Patented | Dec. 28, 1971 |

[54] FIRE-EXTINGUISHING APPARATUS FOR OVENS AND THE LIKE
5 Claims, 4 Drawing Figs.

| [52] | U.S. Cl. | 169/2 R |
|---|---|---|
| [51] | Int. Cl. | A62c 3/00 |
| [50] | Field of Search | 169/1, 2, 26 |

[56] References Cited
UNITED STATES PATENTS

| 1,143,354 | 6/1915 | Bosch | 169/2 |
| 2,598,273 | 5/1952 | Kromer | 169/2 |
| 3,209,837 | 10/1965 | Freedman | 169/2 X |
| 3,318,300 | 5/1967 | Witty | 169/2 X |

Primary Examiner—Lloyd L. King
Attorney—Brown, Murray, Flick & Peckham

ABSTRACT: Fire-extinguishing apparatus, particularly adapted for use in extinguishing grease fires in cooking ovens and the like, characterized in that the fire extinguishing apparatus is built-in and becomes part of the oven itself so that upon occurrence of a fire it is necessary only for a housewife or other person using the oven to depress a button to actuate the extinguisher, either electrically or mechanically, to put out a fire within the oven.

PATENTED DEC 28 1971
3,630,287
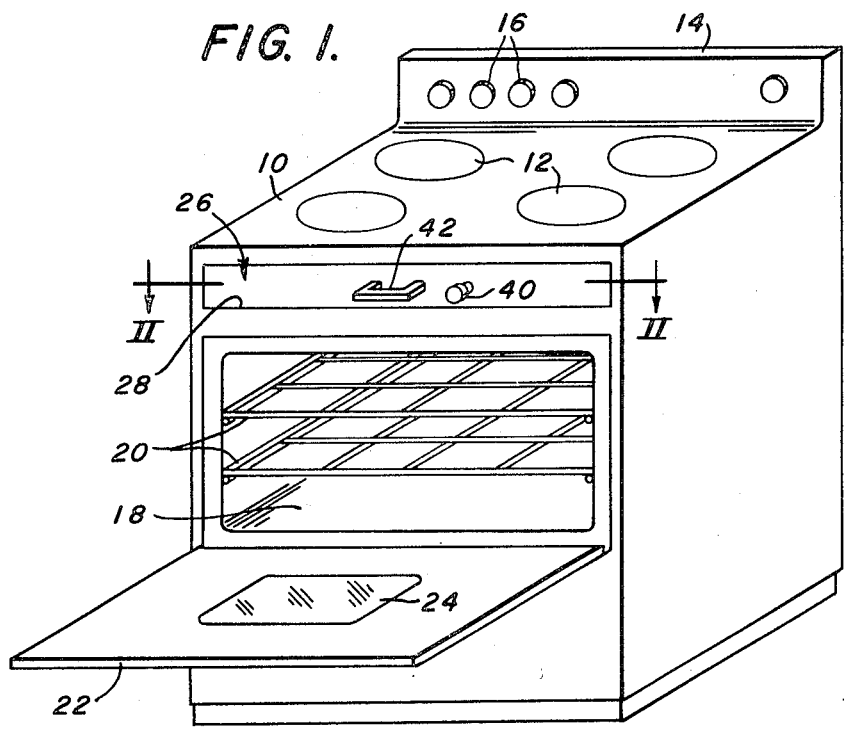
FIG. 1.
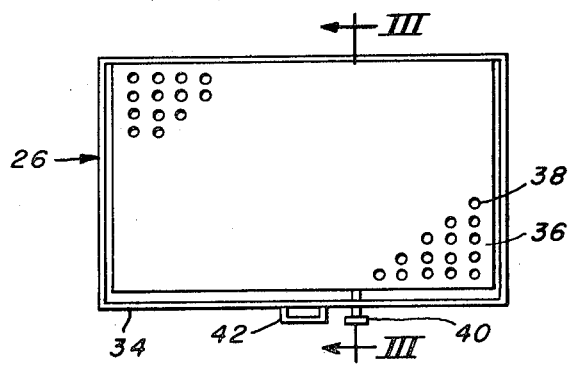
FIG. 2.
FIG. 4.
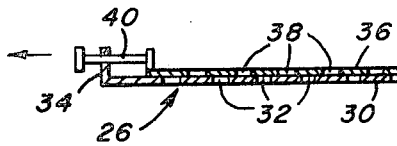
FIG. 3.
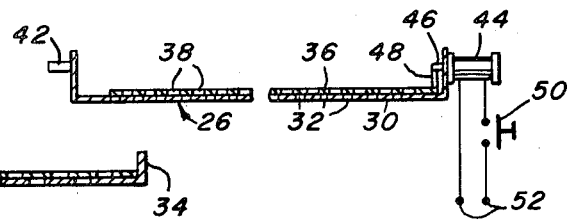
INVENTOR.
ARNOLD S. GOLD
By Brown, Murray, Flick + Peckham
Attorneys

FIRE-EXTINGUISHING APPARATUS FOR OVENS AND THE LIKE

BACKGROUND OF THE INVENTION

As is known, grease fires can easily become ignited in cooking ovens, particularly cooking ovens heated by electrical heating coils, due to grease dripping or spilling down onto the bottom of the oven chamber where the hot coil is located. Normally, such fires should not present too great a hazard since the fire is confined within the oven enclosure and should, eventually burn out without too much damage to the surrounding kitchen fixtures, assuming that the oven door is kept closed. When a grease fire of this type occurs, however, it is the natural reaction of most housewives to open the oven door and attempt to put out the fire. Furthermore, in many cases this leads to putting water on the fire which, of course, causes it to spread and possibly cause extensive damage or even burn down an entire household.

SUMMARY OF THE INVENTION

In accordance with the present invention, a built-in fire extinguisher is provided for ovens and the like which preferably comprises means for sprinkling salt, baking soda, sand or some other granular material onto the fire through the roof of the oven. It should be understood, however, that carbon dioxide or some other fire extinguishing medium for grease and oil fires can be used equally as well.

In one embodiment of the invention shown herein, granular material is stored above the oven chamber in a drawerlike assembly which can be pulled out from the front of the oven in order to charge granular material therein. The bottom of the drawer assembly has a plurality of holes therein; and in sliding engagement with the bottom is a panel, also having a plurality of holes therein, which are normally out of registry with the holes in the bottom of the drawer but which can be moved into registry therewith, thereby causing the granular material to fall into the oven chamber where it can extinguish a fire. The sliding panel can be actuated manually, as by a lever on the front of the oven. Alternatively, it can be moved by an electrical solenoid or the like actuated by a push button located at a point removed from the oven. The latter arrangement is preferable since the actuating button is removed from the oven which, in some cases, may be enveloped by flames.

The above and other objects and features of the invention will become apparent from the following detailed description taken in connection with the accompanying drawings which form a part of this specification, and in which:

FIG. 1 is a perspective view of a typical oven incorporating the fire extinguishing apparatus of the present invention;

FIG. 2 is a cross-sectional view taken substantially along line II—II of FIG. 1 showing a top view of the drawer assembly of the invention;

FIG. 3 is a cross-sectional view taken along line III—III of FIG. 2; and

FIG. 4 is an illustration of and particularly system for actuating the oven fire extinguishing apparatus of the invention with the use of an electrical solenoid.

With reference now to the drawings, and particularly to FIG. 1, the oven shown includes an upper surface 10 provided with a plurality of electrical or gas burners 12; an upstanding back portion 14 which mounts the control knobs 16; an oven enclosure 18 containing racks 20, and the usual heating coil or gas burner, not shown. The oven enclosure 18 is provided with a door 22 having a window area 24. In accordance with the present invention, the top of the oven enclosure 18 is formed by the bottom of a drawer assembly 26 which its into an opening 28 in the forward face of the oven beneath the burners 12. The drawer assembly 26 is perhaps best shown in FIGS. 2 and 3 and comprises a bottom 30 provided with perforations or openings 32 and upstanding sidewall portions 34. Slideable on top of the bottom portion 30 is a plate 36 also provided with openings or perforations 38. The plate 36, however, has length less than that of the bottom 30 and is normally moved into the position shown in FIG. 3, for example, where it openings or perforations 38 do not register with the openings 32 in the bottom 30. Hence, baking soda, salt, sand or some other granular material may be loaded into the drawer assembly 26 above the plate 36 and stored therein.

Connected to one end of the plate 36, at the forward end of the drawer assembly 26, is a knob 40 which may be pulled to the left as viewed in FIG. 3, whereby causing the openings 38 to register with openings 32 to permit the granular material within the drawer assembly to drop through the openings 32 and down into the oven enclosure 18. Adjacent the knob 40 is a handle 42 by which the drawer assembly may be pulled out of the oven and recharged with granular material from time to time. If desired or necessary, insulating material having openings in registry with the openings 32 may be provided between the bottom of the drawer assembly 26 and the top of the oven enclosure 18.

If a fire should occur within the oven enclose 18, it is necessary only to pull the knob 40 forwardly, whereupon the granular material will drop onto the fire and extinguish it.

In FIG. 4, an alternative embodiment of the invention is shown wherein elements corresponding to those shown in FIG. 3 are identified by like reference numerals. In this case, however, the knob 40 is replaced by a solenoid 44 having an actuating plunger 46 which engages an upstanding lip 48 on the plate 36. The solenoid 44, in turn, is connected through a pushbutton switch 50 to a pair of terminals 52 adapted for connection to a source of electrical power, not shown.

The advantage of the embodiment of FIG. 4 is that the pushbutton switch 50 may be located at a substantial distance from the oven, such as over the sink area in a kitchen. It is necessary only to depress the button 50; whereupon the solenoid 44 will push the plate 36 forwardly until its openings 38 register with the openings 32 in the bottom 30 to permit the granular material to fall down onto a fire. The embodiment of FIG. 4 has an additional advantage in that it is not necessary to approach the oven upon the occurrence of a fire in order to actuate the extinguisher, nor is there as great a likelihood of accidental actuation of the fire extinguisher.

Although the invention has been shown in connection with a certain specific embodiment, it will be readily apparent to those skilled in the art that various changes in form and arrangement of parts may be made to suit requirement without departing from the spirit and scope of the invention.

I claim as my invention:

1. A built-in fire extinguisher for ovens and the like comprising a fire-extinguishing medium, means for storing said medium external to the oven enclosure, and manually operated means external to the oven enclosure for causing said medium to be discharged into the oven enclosure to extinguish a fire thereon upon the occurrence of a fire.

2. The fire extinguisher of claim 1 wherein said fire-extinguishing medium comprises granular material.

3. The fire extinguisher of claim 2 including a drawer above said oven enclosure for receiving said granular material, said drawer having a perforated bottom panel and a second perforated panel in sliding engagement with said first panel, the perforations in said bottom panel being normally out of registry with the perforations of said second panel, and means for sliding said second panel on the bottom panel to cause the perforations in the two panels to register with each other and permit granular material to fall down into the oven enclosure.

4. The fire extinguisher of claim 3 wherein said means for sliding said second panel on the bottom panel comprises a manually actuated knob.

5. The fire extinguisher of claim 3 wherein said means for sliding the second panel on said bottom panel comprises an electrically actuated solenoid.

* * * * *